US006764765B2

United States Patent
Ueno et al.

(10) Patent No.: US 6,764,765 B2
(45) Date of Patent: Jul. 20, 2004

(54) FIRE-RETARDANT ADHESIVE, FIRE-RETARDANT ADHESIVE FILM USING THE SAME, AND FLAT CABLE

(75) Inventors: Yoshifumi Ueno, Kanuma (JP); Masayuki Kumakura, Kanuma (JP)

(73) Assignee: Sony Chemicals Corporation, Tokyo (JP)

(*) Notice: Subject to any disclaimer, the term of this patent is extended or adjusted under 35 U.S.C. 154(b) by 0 days.

(21) Appl. No.: 09/738,316

(22) Filed: Dec. 18, 2000

(65) Prior Publication Data

US 2001/0020537 A1 Sep. 13, 2001

Related U.S. Application Data

(63) Continuation-in-part of application No. 09/462,157, filed as application No. PCT/JP99/02436 on May 12, 1999, now abandoned.

(30) Foreign Application Priority Data

May 19, 1998 (JP) .......................................... 10-136268

(51) Int. Cl.⁷ ............................ B32B 27/06; B32B 3/00; H01B 7/00

(52) U.S. Cl. ....................... 428/379; 428/212; 428/372; 428/375; 428/387; 428/383; 428/355 R; 428/354; 428/480; 428/920; 428/921; 174/117 F; 174/117 A; 106/18.11; 106/18.13; 106/18.14; 106/18.21; 106/18.26; 106/18.27; 106/18.3

(58) Field of Search .......................... 106/18.11, 18.13, 106/18.14, 18.21, 18.26, 18.27; 428/372, 379, 389, 383, 212, 355 R, 354, 480, 920, 921; 174/117 F, 117 FF; 524/100

(56) References Cited

U.S. PATENT DOCUMENTS

| 3,666,617 | A | | 5/1972 | Marciniak | |
|---|---|---|---|---|---|
| 4,111,892 | A | | 9/1978 | Kamada et al. | |
| 4,197,235 | A | * | 4/1980 | Nield et al. ................. | 260/45.8 |
| 4,942,061 | A | | 7/1990 | Domes | |
| 5,147,912 | A | | 9/1992 | Moore | |
| 5,618,865 | A | * | 4/1997 | Martens et al. ............. | 524/100 |
| 5,708,065 | A | * | 1/1998 | Martens et al. ............. | 524/100 |
| 5,854,309 | A | | 12/1998 | Blount | |
| 5,859,099 | A | * | 1/1999 | Kasowski .................... | 524/100 |
| 6,025,419 | A | * | 2/2000 | Kasowski et al. ........... | 524/100 |
| 6,166,114 | A | * | 12/2000 | Cosstick et al. ............. | 524/100 |
| 6,333,095 | B1 | * | 12/2001 | Ueno et al. .................. | 428/212 |

FOREIGN PATENT DOCUMENTS

| JP | 52-943 | | 1/1977 |
|---|---|---|---|
| JP | 59-6251 | | 1/1984 |
| JP | 60-120779 | | 6/1985 |
| JP | 62-96580 | | 5/1987 |
| JP | 1-161045 | | 6/1989 |
| JP | 8-60108 | | 3/1996 |
| JP | 9-176591 | | 7/1997 |
| JP | 9-201914 | | 8/1997 |
| JP | 9-235411 | | 9/1997 |
| JP | 11-7838 | | 1/1999 |
| WO | WO 97/23565 | * | 7/1997 |

* cited by examiner

*Primary Examiner*—Cynthia Kelly
*Assistant Examiner*—J. M. Gray
(74) *Attorney, Agent, or Firm*—Oliff & Berridge, PLC

(57) ABSTRACT

A fire-retardant adhesive and a fire-retardant adhesive film, which are suitable for producing flat cables using a non-halogen flame-retardant and have fire-retardant properties rivaling those of halogen flame-retardants while maintaining good electrical insulating properties, comprises (A) a polyester resin, (B) a nitrogen-containing organic flame-retardant and (C) a boron compound.

19 Claims, No Drawings

FIRE-RETARDANT ADHESIVE, FIRE-RETARDANT ADHESIVE FILM USING THE SAME, AND FLAT CABLE

This is a Continuation-in-Part of application Ser. No. 09/462,157 filed Jan. 5, 2000, abandoned which is in turn is a National Stage Application of PCT/JP99/02436 filed May 12, 1999. The entire disclosure of the prior application(s) is hereby incorporated by reference herein in its entirety.

BACKGROUND OF THE INVENTION

1. Field of the Invention

The present invention relates to a fire-retardant adhesive containing a non-halogen flame-retardant with excellent insulating properties, a fire-retardant adhesive film and a flat cable that use the fire-retardant adhesive.

2. Description of the Related Art

Known are Flat cables with a structure where several conductors in lines are covered with 2 pieces of adhesive film where an adhesive layer has been formed on a base film. In recent years this type of flat cable has come to be widely used in AV equipments and computer equipments packaged in a high density.

However, the structural materials other than the conductors of flat cables (that is, the adhesive film comprised of a base film and an adhesive layer) must show good insulating properties and good fire-retardant properties in terms of their electrical use and fire prevention.

Therefore, for years halogen flame-retardants such as decabromodiphenyl ether and hexabromodiphenyl ether and auxiliary flame-retardants such as inorganic fillers (for example, silica, clay and antimony compounds) have been added to the adhesive layer of an adhesive film used in flat cables. However, non-halogen flame-retardants have recently come to be used in place of halogen flame-retardants as the flame-retardant added to adhesive layers in view of the global environmental protection. For instance, Japanese Patent Application Laid-Open No. 6-338225 discloses the addition of a non-halogen flame-retardant such as red phosphorus, phosphoric acid ester and magnesium hydroxide to the polyester fire-retardant layer of adhesive tape for flat cables. Moreover, Japanese Patent Application Laid-Open No. 9-221642 discloses that a thermoplastic polyester resin base as an adhesive film for flat cables or the adhesive layer formed on the base is made fire-retardant by using a phosphorus flame-retardant.

However, when flat cables are used as the wiring for various products related to human safety such as the air bags in automobiles and medical equipments, they must have extremely high insulating properties (in concrete terms, at least $10^{10}$ Ω) in order to guarantee safety.

However, there are problems with the adhesive tape and the adhesive film disclosed in the above-mentioned patent documents in that the electrical resistance of the adhesive tape or the adhesive film cannot be increased enough because of the hygroscopicity or ionicity that the non-halogen flame-retardant that is used itself displays. Moreover, when compared to conventional halogen flame-retardants, the above-mentioned non-halogen flame-retardants intrinsically do not have sufficient fire-retardant properties and the non-halogen flame-retardant content of the adhesive layer must be increased in order to realize the desired insulating properties. Therefore, there is a problem in that the adhesive strength of the adhesive layer lowers and hence the adhesive layer and conductors readily peel apart when the flat cable is produced, or the bonding force of the adhesive layer lowers.

SUMMARY OF THE INVENTION

A object of the present invention is to solve the problems of prior art, and also to give fire-retardant properties rivaling that of halogen flame-retardants to fire-retardant adhesives and fire-retardant adhesive films that use a non-halogen flame-retardant and are useful for the production of fire retardant flat cables while retaining good electrical insulating properties and good adhesion.

The inventors successfully completed the present invention upon discovering that the above-mentioned object can be accomplished by using a polyester resin with relatively low hygroscopicity as the base resin for the fire-retardant adhesive and by using a nitrogen-containing organic flame-retardant (e.g. melamine) as the flame-retardant together with a boron compound as the auxiliary flame-retardant.

That is, the present invention provides a fire-retardant adhesive, comprising the following components (A), (B), and (C):

(A) a polyester resin;

(B) a nitrogen-containing organic flame-retardant; and (C) a boron compound.

Moreover, the present invention provides a fire-retardant adhesive film, comprising an insulating base film and provided thereon a fire-retardant adhesive layer comprised of the above fire-retardant adhesive.

Furthermore, the present invention provides a flat cable in which an electrical conductor is covered with the fire-retardant adhesive film.

DESCRIPTION OF THE PREFERRED EMBODIMENTS

The present invention will be described below in detail.

The fire-retardant adhesive of the present invention comprises the following components (A), (B) and (C):

(A) a polyester resin;

(B) a nitrogen-containing organic flame-retardant; and (C) a boron compound.

The polyester resin of component (A) serves as an adhesive component and as a film-forming component in the fire-retardant adhesive of the present invention. The reason why the polyester resin was chosen is that it has relatively low hygroscopicity when compared to resins such as polyamide resins which are generally used as the adhesive component, and that it has no problems with film strength in terms of actual use and electrical insulating properties thereof are excellent.

Examples of the polyester resin include those made by reacting an acid component (such as terephthalic acid, isophthalic acid, diphenyl dicarboxylic acid, adipic acid, sebacic acid, polyvalent carboxylic acid having a phosphoric acid residue in its molecule, glutaric acid, trimellitic acid, sodium sulfoisophthalate, etc.) with a dialcohol component (such as ethylene glycol, 1,4-butanediol, 1,4-dicyclohexane dimethanol, 1,4-cyclohexane dimethylol, diethylene glycol, ethylene oxide-added trimethylol propanol of bisphenol A, etc.). Of these, a phosphorus-containing polyester resin which has a phosphoric acid residue in its molecule (Japanese Patent Application Laid-Open No. 8-60108) is preferred because of high fire-retardant properties.

The number-average molecular weight of the polyester resin of component (A) is within a range of preferably 3,000 to 100,000, more preferably 10,000 to 50,000 from the viewpoint that sufficient film-forming properties are guaranteed, even when the fire-retardant adhesive contains large amounts of the nitrogen-containing organic flame-retardant of component (B) and the boron compound of component (C), which are mentioned later.

Moreover, the glass transition point of the polyester resin of component (A) is preferably −70 to 100° C., more Preferably 0 to 100° C., muchmore preferably 0 to 70° C., so that there is good thermal adhesion with the conductors arranged in lines when the fire-retardant adhesive is used to make flat cables.

The nitrogen-containing organic flame-retardant of component (B) is one of non-halogen flame-retardants and increases electrical resistance when it is contained in the fire-retardant adhesive. Melamine (cyanurtriamide), melamine derivatives including ammeline (cyanurdiamide), ammelide (cyanurmonoamide), melam (estimated as [3,5-$(NH_2)C_3N_3$]NH), melamine cyanurate (condensate of melamine and cyanuric acid), melamine resin, homoguanamine, benzoguanamine, acetoguanamine, etc., can be given as preferred examples of this type of nitrogen-containing organic flame-retardant of component (B). Of these, melamine, melamine cyanurate and benzoguanamine are preferred in terms of dispersibility, compatibility, adhesion, etc., with the polyester resin.

If too little nitrogen-containing organic flame-retardant of component (B) is used, sufficient flame-retarding effects will not be obtained, while if too much nitrogen-containing organic flame-retardant of component (B) is used, adhesive strength will be insufficient. Therefore, the amount of nitrogen-containing organic flame-retardant of component (B) that is used is preferably 50 to 150 parts by weight, more preferably 50 to 100 part by weight per 100 parts by weight of the polyester resin of component (A).

The boron compound of component (C) is used as an auxiliary flame-retardant that gives a good balance between fire-retardant and adhesion to the fire-retardant adhesive, upon being used together with the nitrogen-containing organic flame-retardant of component (B). Manganese borate, zinc borate, ammonium borate, lead borate, etc., can be mentioned as this type of boron compound. Of these, zinc borate and manganese borate are preferred in terms of fire retardant.

If too little boron compound of component (C) is used, the effects of adding the boron compound will not be sufficient, while if too much is used, there will be a reduction in adhesion. Therefore, the amount of boron compound used is preferably 5 to 150 parts by weight, more preferably 10 to 100 parts by weight, per total 100 parts by weight the polyester resin of component (A) and nitrogen-containing organic flame-retardant of component (B).

Furthermore, various additives, such as organic solvents, antioxidants, metal corrosion inhibitors, coloration agents (pigments, dyes), various coupling agents for improving bonding force between the adhesive component resin and the flame-retardant, crosslinking agents, crosslinking auxiliary agents, fillers, antistatic agents, fire-retardant catalysts, phosphorus flame-retardants, etc., can be added as needed to the fire-retardant adhesive of the present invention as long as the effects of the present invention are not lost.

The fire-retardant adhesive of the present invention can be made by uniformly mixing components (A) through (C) and when necessary, other additive components.

The fire-retardant adhesive of the present invention can be used in the form of a solution, paste, pellets, etc.

The fire retardant adhesive film of the present invention will now be described.

The fire-retardant adhesive film of the present invention has the structure of a fire-retardant adhesive layer comprising the above-mentioned fire-retardant adhesive provided on an insulating base film. Consequently, this fire-retardant adhesive film has fire-retardant properties rivaling that of a halogen fire-retardant can be realized while still maintaining good electrical insulating properties and good adhesion.

The thickness of the fire-retardant adhesive layer varies with the purpose for which the fire-retardant adhesive film is used, etc., but is usually 10 to 100 μm.

Examples of the insulating base film include a polyethylene terephthalate film, a polyethylene naphthalate film, a polyimide film, a polyphenylene sulfide film, a polypropylene oxide film, a polyethylene film, a polypropylene film, a polyamide film, etc. Moreover, the thickness thereof can be selected as needed in accordance with the purpose of use, and is in common several μm to several hundreds μm.

The fire-retardant adhesive film of the present invention can be produced by applying a solution of the above-mentioned fire-retardant adhesive of the present invention containing an organic solvent (such as toluene) to the insulating base film of, e.g., polyethylene terephthalate and drying, or by melt-extrusion of the fire-retardant adhesive on an insulating base film to a fire-retardant adhesive layer to form a fire-retardant adhesive layer.

The fire-retardant adhesive film of the present invention can be used as a film for protecting the surface of various circuits. It is particularly preferred used for producing flat cables. For example, a flat cable can be produced by placing several conductors parallel to one another and then laminating the fire-retardant adhesive films over and under the conductors so as to sandwich the conductors with the fire-retardant adhesive films. The fire-retardant adhesive film does not show sufficient adhesion at normal temperature because of the presence of the flame-retardant, and therefore, the flat cable can be produced by the thermal-laminating method whereby a roll that has been heated to from 80 to 200° C. is used during lamination.

EXAMPLES

The present invention will now be explained using actual examples.

Examples 1 through 7 and Comparative Examples 1 through 4

(Preparation of Fire-retardant Adhesive)

Polyester resin (ELITER™ Series (saturated polyester resin), produced by Unichika Co., Ltd.) was dissolved in a mixed solvent containing methyl ethyl ketone (75 parts by weight) and toluene (300 parts by weight) in the amounts shown in Table 1 and Table 2, and a flame-retardant and an auxiliary flame-retardant were added to this solution and mixed and agitated to prepare the flame-retardant adhesive in solution form.

(Production of Fire-retardant Adhesive Film)

The fire-retardant adhesive in solution form was applied with a bar coater to a polyester film with a thickness of 25 μm (available from Unichika Co., Ltd.) and introduced to a drying oven to evaporate the methyl ethyl ketone and toluene to form the fire-retardant adhesive layer (40 μm thick). As a result, a fire-retardant adhesive film was obtained.

(Production of Flat Cable)

Two the fire-retardant adhesive films that were obtained were cut to a designated length and used. On the one fire-retardant adhesive film, several flat wire conductors with a wire thickness of 50 μm (flat copper wire plated with tin) were placed parallel to one another, and the other fire-retardant adhesive film was placed thereon to give a laminate. This laminate was then passed between two rolls that had been heated to 150° C. to produce a flat cable.

(Evaluation)

Evaluation on "electrical resistance", "fire-retardant and combustion gas", and "adhesion" was performed as described below on the fire-retardant adhesives in Examples 1 through 7 and Comparative Examples 1 through 4. The results that were obtained are listed in Tables 1 and 2.

(Electrical Resistance)

Electrical resistance (applied voltage of 0.5 kV) between adjacent conductors (conductor length of 100 mm) of the flat cable was measured. Electrical resistance was evaluated as "○" when it was more than $10^{11}$ Ω, as "Δ" when it was from $10^{10}$ Ω to $10^{11}$ Ω and as "×" when it was under $10^{10}$ Ω.

Here, electrical resistance of $10^{10}$ Ω or higher is necessary if the flat cable is to be used in automobiles, medical equipment, etc., that must be very safe.

(Fire-retardant and Combustion Gas)

Fire-retardant tests were performed in accordance with UL-SUB758-VW1. Here, fire-retardant was evaluated as "⊚" when the fire-retardant adhesive shows the same fire-retardant as the halogen flame-retardant (Comparative Example 4), was evaluated as "○" when there are no problems in terms of practical use, although fire-retardant is inferior to halogen flame-retardants, and was evaluated as "×" when there were problems in terms of practical use.

Moreover, the gas generated during the fire-retardant tests was collected and gas chromatography analysis of this gas was performed. Here, the case where no halogen gas was confirmed was evaluated as "○" and the case where halogen gas was confirmed was evaluated as "×".

(Adhesion)

A part where the fire-retardant adhesive films adhered to one another and a part where the conductor and the fire-retardant adhesive film adhered to one another were cut out and placed for 1 week in a thermostatic chamber at 60° C. Then adhesive strength was measured with a Tensilon (available from Orientech Co., Ltd.). Here, the adhesive strength between the films that adhered to one another and between the conductor and the adhesive film was evaluated as "○" when adhesive strength of more than 0.5 kg/cm was measured, as "Δ" when adhesive strength of 0.3 kg/cm to 0.5 kg/cm, and as "×" when adhesive strength was less than 0.3 kg/cm.

TABLE 1

| Fire-retardant adhesive component | (Parts by weight) Example | | | | | | |
|---|---|---|---|---|---|---|---|
| | 1 | 2 | 3 | 4 | 5 | 6 | 7 |
| Polyester resin | 100 | 100 | 100 | 100 | 100 | 100 | 100 |
| Nitrogen-containing organic flame-retardent | | | | | | | |
| Melamine cyanurate | 100 | 100 | 100 | 100 | — | — | 100 |
| Melamine | — | — | — | — | 100 | — | — |
| Benzoguanamine | — | — | — | — | — | 100 | — |

TABLE 1-continued

| Fire-retardant adhesive component | (Parts by weight) Example | | | | | | |
|---|---|---|---|---|---|---|---|
| | 1 | 2 | 3 | 4 | 5 | 6 | 7 |
| Boron compound (flame-retarding auxiliary agent) | | | | | | | |
| Zinc borate | 10 | 50 | 100 | 150 | 50 | 50 | — |
| Manganese borate | — | — | — | — | — | — | 50 |
| (Evaluations) | | | | | | | |
| Fire retardant | ○ | ⊚ | ○ | ○ | ⊚ | ⊚ | ○ |
| Combustion gas | ○ | ○ | ○ | ○ | ○ | ○ | ○ |
| Electrical resistance | ○ | ○ | ○ | ○ | ○ | ○ | Δ |
| Adhesion | ○ | ○ | ○ | Δ | ○ | ○ | ○ |

TABLE 2

| Fire-retardant adhesive component | (Parts by weight) Comparative Example | | | |
|---|---|---|---|---|
| | 1 | 2 | 3 | 4 |
| Polyester resin flame-retardant | 100 | 100 | 100 | 100 |
| Melamine cyanurate | 100 | 100 | — | — |
| Ammonium polyphosphate | — | — | 100 | — |
| Decabromodiphenyl oxide | — | — | — | 60 |
| Auxiliary flame-retardant | | | | |
| Zinc borate | — | — | 50 | — |
| Aluminum hydroxide | — | 50 | — | — |
| Antimony trioxide | — | — | — | 20 |
| (Evaluations) | | | | |
| Fire retardant | × | × | ⊚ | — |
| Combustion gas | ○ | ○ | ○ | × |
| Electrical resistance | ○ | ○ | × | ○ |
| Adhesion | ○ | ○ | × | ○ |

(Results)

As is clear from Table 1, fire-retardant adhesives in Examples 1 through 7 showed a high electrical resistance and also a high fire-retardant and adhesive strength. Especially the fire-retardant adhesive of Example 2, where 50 parts by weight of zinc borate were added to 100 parts by weight of the polyester resin, showed even better fire-retardant properties while maintaining good electrical resistance and adhesion.

Furthermore, the fire-retardant adhesive of Example 4 where 150 weight parts of zinc borate were added per 100 weight parts of the polyester resin showed a tendency toward a reduction in adhesive strength. It is clear from this that the amount of zinc borate that is added should not exceed 150 weight parts per 100 weight parts of the polyester resin.

Moreover, the fire-retardant adhesives of Examples 5 and 6, which contained nitrogen-containing organic flame-retardants other than melamine cyanurate showed the same high electrical resistance, good fire-retardant and good adhesive strength as the fire-retardant adhesives of Examples 1 and 2.

On the other hand, as is also clear from Table 2, the fire-retardant adhesive of Comparative Example 1, which is an example of not using an auxiliary flame-retardant, does not have sufficient fire-retardant properties. Moreover, it is clear that there are problems with fire-retardant properties of the fire-retardant adhesive of Comparative Example 2, where aluminum hydroxide was used as the auxiliary flame-retardant. It is shown that the fire-retardant adhesive of Comparative Example 3, which is an example where water-proofing treated ammonium polyphosphate was used as the flame-retardant, does not have a sufficient electrical resistance. Moreover, adhesion was insufficient as well.

Furthermore, it is obvious that the problem of combustion gas cannot be solved by the fire-retardant adhesive of Comparative Example 4, which is a comparative example of using a halogen flame-retardant.

By means of the present invention, the fire retardant rivaling that of halogen flame-retardants can be realized while maintaining good electrical insulating properties and adhesion with respect to a fire-retardant adhesive of the fire-retardant adhesive film appropriate for making flat cables that uses a non-halogen flame-retardant.

What is claimed is:

1. A fire-retardant adhesive, comprising the following components (A), (B), and (C):
   (A) a polyester resin;
   (B) a nitrogen-containing organic flame-retardant, in an amount of 50 to 150 parts by weight per 100 parts by weight of the polyester resin of component (A), wherein the nitrogen-contaning organic flame-retardant of component (B) is at least one member selected from the group consisting of melamine, ammeline, ammelide, melam, melamine cyanurate, melemine resin, homoguanamine, benzoguanamine, and acetoguanamine; and
   (C) a boron compound, in an amount of 25 to 75 parts by weight per total 100 parts by weight of the polyester resin of component (A) and the nitrogen-containing organic flame-retardant of component (B).

2. The fire-retardant adhesive according to claim 1, wherein the nitrogen-containing organic flame-retardant of component (B) is contained in an amount of 50 to 100 parts by weight per 100 parts by weight of the polyester resin of component (A).

3. The fire-retardant adhesive according to claim 1, wherein the polyester resin of component (A) is a phosphorus-containing polyester resin having a phosphoric acid residue in its molecule.

4. The fire-retardant adhesive according to claim 1, wherein the boron compound of component (C) is at least one selected from the group consisting of manganese borate, zinc borate, ammonium borate, and lead borate.

5. The fire-retardant adhesive according to claim 4, wherein the boron compound of component (C) is zinc borate.

6. Fire-retardant adhesive film, comprising an insulating base material film and formed thereon a fire-retardant adhesive layer comprised of the fire-retardant adhesive according to claim 1.

7. A flat cable, comprising an electrical conductor and the adhesive film according to claim 6 covering the electrical conductor.

8. The fire-retardant adhesive film according to claim 6, wherein an adhesive strength between the insulating base material film and the fire-retardant adhesive is more than 0.5 kg/cm.

9. The fire-retardant adhesive film according to claim 6, wherein an adhesive strength between the insulating base material film and the fire-retardant adhesive is more than 0.3 kg/cm.

10. The fire-retardant adhesive according to claim 1, wherein the polyester resin of component (A) has a glass transition point of −70 to 100° C.

11. The fire-retardant adhesive according to claim 1, wherein the fire-retardant adhesive is in a form selected from the group consisting of solution, paste, and pellets.

12. The fire-retardant adhesive according to claim 1, wherein the fire-retardant adhesive is in a form selected from the group consisting of solution and paste.

13. A flat cable, comprising an electrical conductor and an adhesive film overlying the electrical conductor,
   wherein the adhesive film comprises the following components (A), (B), and (C):
   (A) a polyester resin;
   (B) a nitrogen-containing organic flame-retardant; and
   (C) a boron compound.

14. A flat cable according to claim 13, wherein the nitrogen-containing organic flame-retardant of component (B) is contained in an amount of 50 to 100 parts by weight per 100 parts by weight of the polyester resin of component (A), and the boron compound of component (C) is contained in an amount of 10 to 100 parts by weight per total 100 parts by weight of the polyester resin of component (A) and the nitrogen-containing organic flame-retardant of component (B).

15. A flat cable according to claim 13, wherein the polyester resin of component (A) is a phosphorus-containing polyester resin having a phosphoric acid residue in its molecule.

16. A flat cable according to claim 13, wherein the nitrogen-containing organic flame-retardant of component (B) is at least one member selected from the group consisting of melamine, ammeline, ammelide, melam, melamine cyanurate, melemine resin, homoguanamine, benzoguanamine, and acetoguanamine.

17. A flat cable according to claim 13, wherein the boron compound of component (C) is at least one selected from the group consisting of manganese borate, zinc borate, ammonium borate, and lead borate.

18. A flat cable according to claim 13, wherein the boron compound of component (C) is zinc borate.

19. A flat cable according to claim 13, wherein the polyester resin of component (A) has a glass transition point of −70 to 100° C.

* * * * *